United States Patent
Levy et al.

(10) Patent No.: US 9,830,819 B2
(45) Date of Patent: *Nov. 28, 2017

(54) SYSTEM AND METHOD FOR IDENTIFYING PARKING SPACES FOR A COMMUNITY OF USERS

(71) Applicant: ANAGOG LTD., Ramat Gan (IL)

(72) Inventors: Gil Levy, Tel Aviv (IL); Yaron Aizenbud, Haifa (IL)

(73) Assignee: ANAGOG LTD., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,064

(22) Filed: Aug. 10, 2015

(65) Prior Publication Data

US 2015/0348415 A1   Dec. 3, 2015

Related U.S. Application Data

(63) Continuation of application No. 13/971,291, filed on Aug. 20, 2013, now Pat. No. 9,135,821, which is a continuation of application No. 12/936,762, filed as application No. PCT/IB2009/051470 on Apr. 7, 2009, now Pat. No. 8,576,092.

(60) Provisional application No. 61/123,311, filed on Apr. 8, 2008.

(51) Int. Cl.
| | |
|---|---|
| *G08G 1/14* | (2006.01) |
| *H04W 4/02* | (2009.01) |
| *G01C 21/36* | (2006.01) |
| *G08G 1/005* | (2006.01) |

(52) U.S. Cl.
CPC ......... *G08G 1/14* (2013.01); *G01C 21/3685* (2013.01); *G08G 1/144* (2013.01); *G08G 1/147* (2013.01); *H04W 4/027* (2013.01); *G08G 1/005* (2013.01)

(58) Field of Classification Search
CPC . G01S 2205/002; H04W 12/08; H04W 48/04; H04W 4/027; H04W 64/006; H04W 8/02; B60K 31/0008; B60K 2350/1092; B60K 35/00; B60Q 1/2611; B60Q 1/50; B60W 2550/308; B60W 30/143; B60W 2520/10
USPC .... 340/932.2, 505, 933, 501, 942, 916, 468, 340/686.1, 687, 988–989, 993, 992
See application file for complete search history.

(56) References Cited

U.S. PATENT DOCUMENTS

| | | | |
|---|---|---|---|
| 5,629,693 A * | 5/1997 | Janky | B60R 25/102 |
| | | | 180/287 |
| 6,107,942 A | 8/2000 | Yoo | |
| 6,285,297 B1 * | 9/2001 | Ball | G08G 1/14 |
| | | | 340/932.2 |

(Continued)

FOREIGN PATENT DOCUMENTS

| | | |
|---|---|---|
| DE | 29909002 | 5/1999 |
| WO | WO2007/083997 | 7/2007 |

*Primary Examiner* — Daniel Previl
(74) *Attorney, Agent, or Firm* — Tutunjian & Bitetto, P.C.

(57) ABSTRACT

A mobile communications device includes a locator unit to receive and process information regarding a current location for the mobile communications device, a parking status determination unit to determine a parking status for the device based on at least changes in the current location, and a communication unit to forward the parking status to a parking community processor. A method includes determining a parking status of a vehicle associated with a person as a function of movement of a personal mobile communications device.

25 Claims, 10 Drawing Sheets

(56) References Cited

U.S. PATENT DOCUMENTS

| | | |
|---|---|---|
| 6,489,921 B1 | 12/2002 | Wilkinson |
| 6,750,786 B1 | 6/2004 | Racunas, Jr. |
| 8,050,690 B2 * | 11/2011 | Neeraj .................. G06Q 10/10 455/456.1 |
| 9,135,821 B2 * | 9/2015 | Levy ...................... G08G 1/144 |
| 2003/0112154 A1 * | 6/2003 | Yoakum ................. G07B 15/02 340/932.2 |
| 2003/0128136 A1 | 7/2003 | Spier |
| 2005/0195095 A1 | 9/2005 | Kato et al. |
| 2005/0240344 A1 * | 10/2005 | Tomita .................. G01C 21/34 701/431 |
| 2006/0033641 A1 * | 2/2006 | Jaupitre .................. G08G 1/14 340/932.2 |
| 2007/0026802 A1 * | 2/2007 | Gerstenkorn ........... B66B 1/468 455/41.2 |
| 2007/0040701 A1 * | 2/2007 | Browne ................. G08G 1/143 340/932.2 |
| 2007/0061192 A1 | 3/2007 | Chew |
| 2007/0097209 A1 | 5/2007 | Kubota |
| 2007/0194902 A1 | 8/2007 | Blanco |
| 2007/0216530 A1 * | 9/2007 | Fukuoka ................ B60R 11/02 340/572.1 |
| 2007/0290888 A1 | 12/2007 | Reif |
| 2009/0047972 A1 | 2/2009 | Neeraj |
| 2010/0171642 A1 * | 7/2010 | Hassan ................. G01C 17/38 340/992 |

\* cited by examiner

SYSTEM AND METHOD FOR IDENTIFYING PARKING SPACES FOR A COMMUNITY OF USERS

CROSS-REFERENCE TO RELATED APPLICATIONS

This application is a continuation and claims benefit of U.S. non-provisional application Ser. No. 13/971,291 filed Aug. 20, 2013, which is a continuation and claims the benefit of U.S. non-provisional application Ser. No. 12/936,762 filed Feb. 27, 2011, now U.S. Pat. No. 8,576,092, which claims benefit under 35 U.S.C. 365 of International Application No. PCT/IB2009/51470, filed Apr. 7, 2009, which claims benefit from U.S. Provisional Patent Application No. 61/123,311, filed Apr. 8, 2008, all of which are hereby incorporated by reference in their entirety.

FIELD OF THE INVENTION

The present invention relates to identifying parking spaces generally and to doing so with mobile communications devices in particular.

BACKGROUND OF THE INVENTION

One of the more inconvenient and often annoying aspects of driving an automotive vehicle is the continual need to find a place to park the vehicle when it is not in use.

A number of solutions are available for identifying available parking spaces and/or directing drivers seeking parking to those spaces. For example, U.S. patent application Ser. No. 11/059,689 by Kato et al discloses a dedicated communication system to be implemented in vehicles to detect parking departure signs such as the unlocking of car doors, insertion of the ignition key, and the starting of the engine. Drivers of other cars in the area may then be directed via the communication system to park in what is presumed to be a space recently vacated by the first car.

U.S. patent application Ser. No. 10/025,704 by Yoakum et al discloses a system utilizing mobile terminals, such as mobile telephones, to initiate parking information requests and receive parking information gathered from participating parking vendors. The mobile terminals are equipped with a location service to define the area in which to present parking space availability.

SUMMARY OF THE INVENTION

An object of the present invention is to improve the prior art.

There is therefore provided in accordance with a preferred embodiment of the present invention, a mobile communications device includes a locator unit to receive and process information regarding a current location for the mobile communications device, a parking status determination unit to determine a parking status for the device based on at least changes in the current location, and a communication unit to forward the parking status to a parking community processor.

Further, in accordance with a preferred embodiment of the present invention, the parking status determination unit includes means to operate without proactive user input.

Still further, in accordance with a preferred embodiment of the present invention, the mobile communications device also includes a receiver to receive parking status reports from the parking community, and means to present the parking status reports to a user of the device.

Additionally, in accordance with a preferred embodiment of the present invention, the means to present are at least one of an indicator to indicate an available parking space within a given radius, a screen display of a map indicating recently vacated parking spaces near the current location, and an audio signal.

Moreover, in accordance with a preferred embodiment of the present invention, the communication unit includes means to use at least one of a web page, an email, an SMS, and an instant message (IM).

Further, in accordance with a preferred embodiment of the present invention, the mobile communications device also includes a status indicator to provide non location status indications to the parking status determination unit, where the non location status indications are at least one of battery charging, keyboard usage, touch screen usage, data flow characteristics, "hands free" speaker usage, accelerometer output and camera usage.

Still further, in accordance with a preferred embodiment of the present invention, the parking status determination unit includes means to store recent history for the parking status.

Additionally, in accordance with a preferred embodiment of the present invention, the mobile communications device also includes a requestor to proactively request the parking status reports based on a location.

Moreover, in accordance with a preferred embodiment of the present invention, the locator unit is at least one of accelerometer, mobile base station signal, compass, on ground AGPS signal, and a GPS unit.

Further, in accordance with a preferred embodiment of the present invention, the mobile communications device is a mobile telephone associated with a member of the community.

Still further, in accordance with a preferred embodiment of the present invention, the parking status determination unit includes a predictor to predict expected changes in the parking status based on "retracing of steps" by the device to a location where the parking status was previously determined.

Additionally, in accordance with a preferred embodiment of the present invention, the mobile communications device also includes a parked vehicle finder to find a parked vehicle in accordance a location at which the parked vehicle was determined to be "parked".

There is also provided in accordance with a preferred embodiment of the present invention, a method implementable in software for participating in a parking community including establishing a current location for a mobile communications device, calculating a speed for the device based on time and distance between the current location and a previously stored location, determining the parking status as a function of the speed, at least one previously calculated speed, and at least one previously determined parking status, and forwarding the parking status to the parking community.

Further, in accordance with a preferred embodiment of the present invention, the method also includes storing a history of the current locations as the previously stored locations, and analyzing the history to identify recurring patterns indicative of an expected change in the parking status.

Still further, in accordance with a preferred embodiment of the present invention, the recurring patterns are a "retracing of steps" toward a parking location at a the speed consistent with a user of the device returning to the parking location on foot, the parking location identified as the current location for the device at a time when the parking status of "parked" was most recently determined for the device.

Additionally in accordance with a preferred embodiment of the present invention, the method also includes receiving parking status reports from the parking community.

Moreover, in accordance with a preferred embodiment of the present invention, the parking status reports are in the form of at least one of an indicator to indicate an available parking space within a given radius, a screen display of a map indicating recently vacated parking spaces near the current location and an audio signal.

Further, in accordance with a preferred embodiment of the present invention, the parking status reports are received via at least one of a web page, an email, an SMS, and an instant message (IM).

Still further, in accordance with a preferred embodiment of the present invention, the method also includes proactively requesting the parking status reports.

Additionally, in accordance with a preferred embodiment of the present invention, the method also includes locating a parked car based on a location for which a the parking status of "parked" was most recently determined.

There is also provided in accordance with a preferred embodiment of the present invention, a method including determining a parking status of a vehicle associated with a person as a function of movement of a personal mobile communications device associated with the person.

There is also provided in accordance with a preferred embodiment of the present invention, a parking community server implementable on a computing device including a receiver to receive parking status messages from members of a parking community, where the messages comprise at least a parking status and a current location, the parking status indicating at least one of "parking", "exiting parking", a mapper to map the parking statuses per the current locations to derive a persistent representation of usable parking spaces in a given area, and means to transmit at least the persistent representation to at least the members.

Further, in accordance with a preferred embodiment of the present invention, the mapper includes a parking facility determiner to determine locations for parking facilities suitable for multiple vehicles from an analysis of clustered the usable parking spaces.

Still further, in accordance with a preferred embodiment of the present invention, the mapper also includes an entrances/exits determiner to determine locations for the entrances/exits to/from the parking facilities from an analysis of common movements reported by the members prior/subsequent to a parking event.

There is also provided, in accordance with a preferred embodiment of the present invention, a method including receiving parking status messages from members of a parking community, the messages indicating at least a current location and a parking status, mapping the parking statuses per the locations to derive a persistent representation of usable parking spaces in a given area, and transmitting the persistent representation to at least the members.

Further, in accordance with a preferred embodiment of the present invention, the method also includes identifying clusters of the usable parking spaces indicative of parking facility locations, and analyzing parking patterns from the parking status messages to determine locations for entrances/exits to/from the location, where the parking status message indicate at least a recent history of locations.

There is also provided in accordance with a preferred embodiment of the present invention, a search utility implementable in software including a search engine to search a repository for at least a service and an associated business address where the service is available, a parking availability utility to cross reference an available parking database to identify current parking availability in an area around the associated address, and a results presenter to present the service with at least an indication of the current parking availability to a user.

Further, in accordance with a preferred embodiment of the present invention, the available parking database is derived from an analysis of location based parking reports received from a community of mobile communications device users.

There is also provided in accordance with a preferred embodiment of the present invention, a method implementable in software for searching a repository of information including searching for at least a service and its associated business address, cross referencing an available parking database to identify current parking availability in an area around the business address, and presenting the service with at least an indication of the current parking availability to a user.

Further, in accordance with a preferred embodiment of the present invention, the available parking database is derived from an analysis of location based parking reports received from a community of mobile communications device users.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
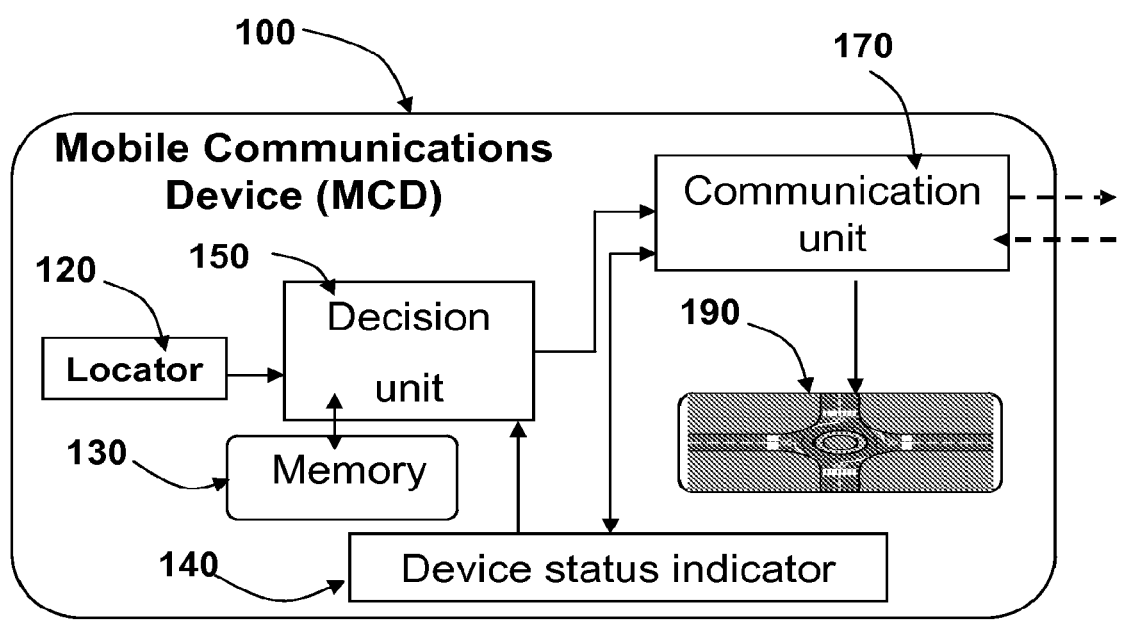
FIG. 1 is a schematic illustration of a novel mobile communications device constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that since mobile communications devices, such as mobile telephones, personal digital assistants (PDAs) and the like, may typically comprise location functionality, they may be used to automatically determine a parking status for a vehicle driven by a user. Such devices may be capable of providing frequent location reporting with a high degree of precision. By analyzing a series of such reports, the user's recent movements may be tracked and a speed may be inferred. From the user's movements and speed, it may be possible to infer a parking status for a vehicle driven by the user. Accordingly, it may be possible to determine a parking status for a vehicle presumed to be at a precise location at a given time. The status information may then be shared with other drivers that may be looking for parking in the same general location.

Reference is now made to FIG. 1, which illustrates a novel mobile communications device 100 constructed and operative in accordance with a preferred embodiment of the present invention. In accordance with a preferred embodiment of the present invention, device 100 may be a mobile phone. It will be appreciated that device 100 may also be any other suitable mobile communications device that may be capable of wireless communication such as a PDA, or even a computer laptop.

Device 100 may comprise a communications unit 170, a display unit 190 and a parking decision unit 150. Device 100 may also comprise a locator 120, a memory 130 and a device status indicator 140. As will be described hereinbelow, decision unit 150 may use information from locator 120, memory 130 and/or phone status indicator 140 to automatically determine a parking status for a user's vehicle. Such statuses may be referred to hereinafter as "Exiting Parking" (ExP), "Parked", and "Entering Parking" (EnP).

Locator 120 may provide location and timing parameters such as, for example, the time, location of device 100, the precision of locator 120 and the like. In accordance with a preferred embodiment of the present invention, locator 120 may be a global positioning satellite (GPS) module. However, it will be appreciated that locator 120 may employ any technology suitable for establishing location such as, for example, accelerometers, mobile base station signals, compasses, and on ground AGPS signals.

Memory 130 may be any data storage unit capable of storing the data required for unit 150 to determine a parking status. Communication unit 170 may facilitate transmission of data, signals and messages from device 100 as necessary. It will be appreciated that unit 170 may be implemented using a mobile telephone's built-in functionality. Alternatively, a dedicated communication unit 170 may also be implemented if so required. It will also be appreciated that any suitable communications technology may be used to communicate with/from unit 170. For example, a web page, instant message (IM) or an SMS may be used.

Decision unit 150 may receives information from locator 120 and may statistically determine a parking status for device 100. Decision unit 150 may forward an associated message regarding the parking status of device 100 when the determined status may be an Exiting Parking (ExP) status, or an Entering Parking (EnP) status.

In accordance with an alternative preferred embodiment of the present invention, decision unit 150 may also consider non location specific information when determining a parking status. For example, turning off device 100, charging its battery, using a virtual keyboard, using a touch screen, data flow characteristics, "hands free" speaker usage, accelerometer data and camera usage may all indicate a change in a parking status. Device status indicator 140 may provide indications of such changes to decision unit 150. It will be appreciate that device status indicator 140 may be implemented as a software component of device 100. It will also be appreciated that in addition to, or in replacement of, device status indicator 140, a hardware interface with a vehicle may provide other parking indications such as gearshift status, activation of cruise control, windshield wiper activation, speed, etc.

Display unit 190 may enable graphical display of text or picture based data. For example, display unit 190 may comprise a processor and a screen to enable display of mapping software applications that may show the user the location of vacant parking spaces, or display a text message with information regarding parking statuses of other users of devices 100. In accordance with a preferred embodiment of the present invention, display 190 may be the built-in display functionality of a mobile telephone. It will be appreciated that the present invention may not comprise a standalone GUI application for displaying parking status information. For example, a parking indicator flag may be displayed on an existing system screen for device 100. Such a flag may be displayed on a default screen displayed by a mobile telephone "waiting" for an incoming phone call. The flag may indicate that, for example, that there may be at least one free parking space within a given radius. Different colors or types of flags may indicate the number of parking spaces available or how far the nearest parking space may be. It will also be appreciated that device 100 may also be configured to receive audio signals and generated audio messages regarding parking statuses.

Figure 2:
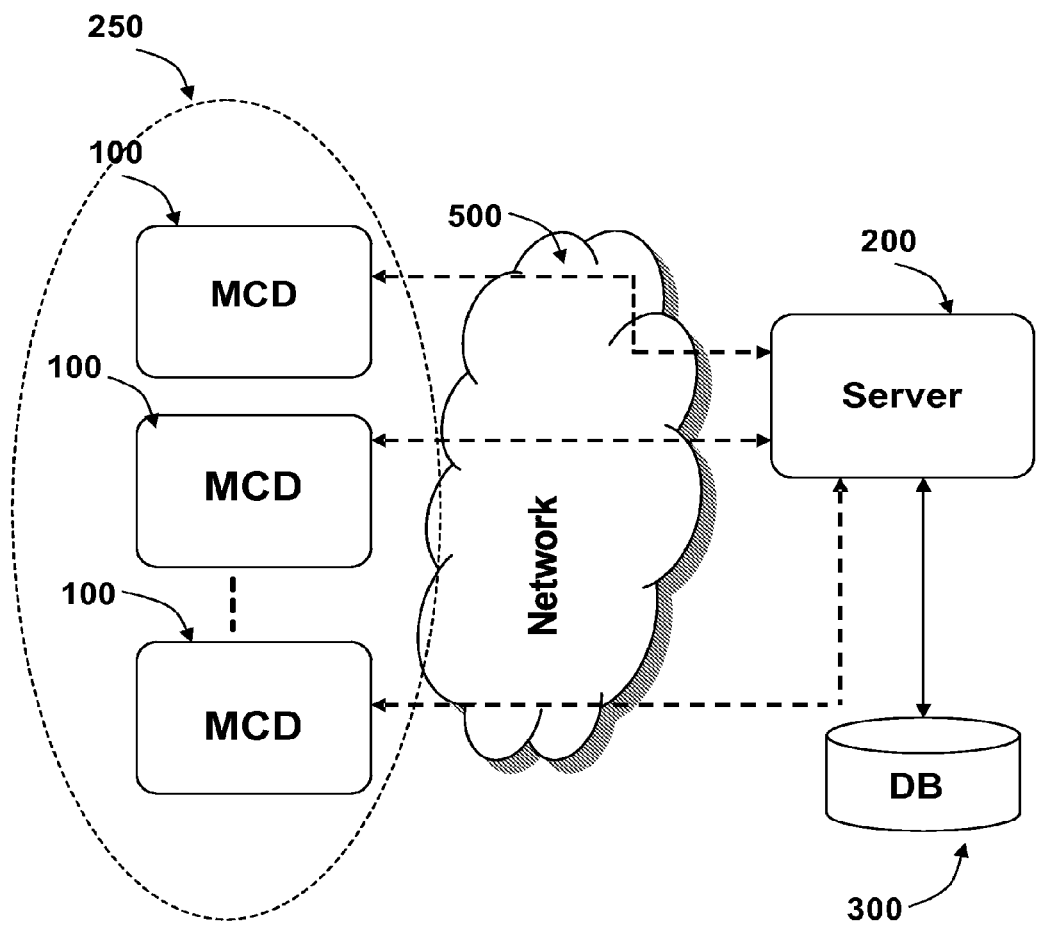
FIG. 2 is a schematic illustration of devices of FIG. 1 devices communicating with a community server, in accordance with a preferred embodiment of the present invention.

Reference is now made to FIG. 2 which may illustrate an exemplary community 250 of devices 100 communicating with at least one server 200 through at least one network 500. Server 200 may use database 300 to store reference data, such as maps and indexes of street addresses. Database 300 may also store current and/or historical information as necessary.

Devices 100 may send parking status messages to server 200, whenever they determine that they are own entering or exiting a parking space. The data accumulated during a predefined time-interval from all devices 100 in community 250 may be processed by server 200 and sent to subscribers of information services provided by server 200. It will be appreciated that the subscribers may be the members of community 250, other users with suitable communication devices, or both.

Server 200 may distribute the processed parking information in accordance with the location of the communication devices receiving the information. Server 100 may use a variety of data formats. For example it may forward the information using either graphical or textual representation, or both.

In accordance with an exemplary embodiment of the present invention, server 200 may receive parking status messages from devices 100 located throughout an entire city area. After processing the received messages, server 200 may selectively forward parking status notifications to users based on their current neighborhood or street (as per reference data stored in database 300). It will be appreciated that for these purposes server 200 may derive the locations of devices 100 from the received parking status messages. However, in accordance with a preferred alternative embodiment of the present invention, subscribers (regardless of whether or not they may be members of community 250)

may also proactively push their associated location data to server 200 when requesting local parking notifications.

It will be appreciated that some mobile phones may not be capable of supporting the implementation of decision unit 150, even if they are equipped with a locator 120 or a device status indicator 140. For example, the phone itself may not have the required processing power. In accordance with an alternative embodiment of the present invention, server 200 may also comprise a decision unit 150 to enable identification of parking statuses based on location or device status indications received from members of community 250. Server 200 may receive such information from devices 100 and determine parking statuses for participating devices 100 at any predefined time-interval.

Figure 3:
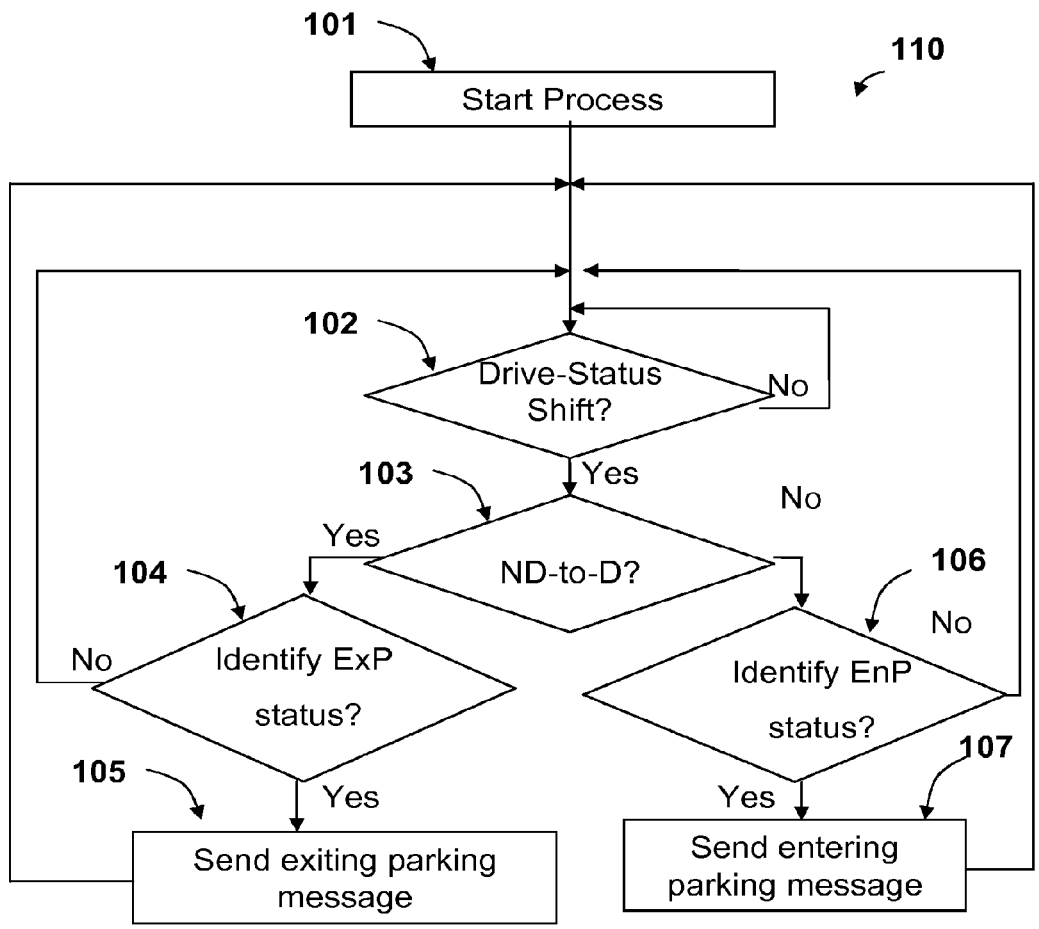
FIG. 3 is a flow chart that schematically illustrates the general operation of the device of FIG. 1.

FIG. 3, to which reference is now made, is a flow chart that may illustrates an exemplary process 110 for identifying parking statuses using a device 100. It will be appreciated that device 100 may be configured to start running process 110 automatically soon after device 100 is turned on. Process 110 may require no proactive input from a user. Once process 110 is started (step 101), decision unit 150 may check (step 102) for a shift in driving status. Such a shift may be indicated, for example, by a cessation/start of movement as determined from information received from locator 120. Alternatively, it may also be indicated by device status indicator 140. If no such shift in status is indicated, step 102 may be repeated.

If a shift may be indicated, decision unit may check (step 103) whether it is from a driving to a non-driving status (D-to-ND), or from a non-driving-to-a-driving (ND-to-D) status. If the decision unit 150 may have identified a ND-to-D shift, it may use at least one algorithm to identify (step 104) whether or not the shift may indicate an ExP (exit from a parking space) status. If an ExP may be identified, device 100 may send (step 105) a parking status message to server 200 or directly to another user or address. The message may comprise a text message such as "Vacant" that may include indication of the parking status and other related data, such as the location of the vacant parking space, etc. Process 110 may then return to step 102.

If step 103 may have indicated a D to ND shift, it may use at least one algorithm to identify (step 106) whether or not the shift may indicate an EnP (entering a parking space) status. If an EnP may be identified, device 100 may send (step 107) a parking status message to server 200 or directly to another user or address. The message may comprise a text message such as "Occupied" and may also include indication of the parking status and other related data, such as the location of the occupied parking space, etc. Process 110 may then return to step 102.

Figure 4:
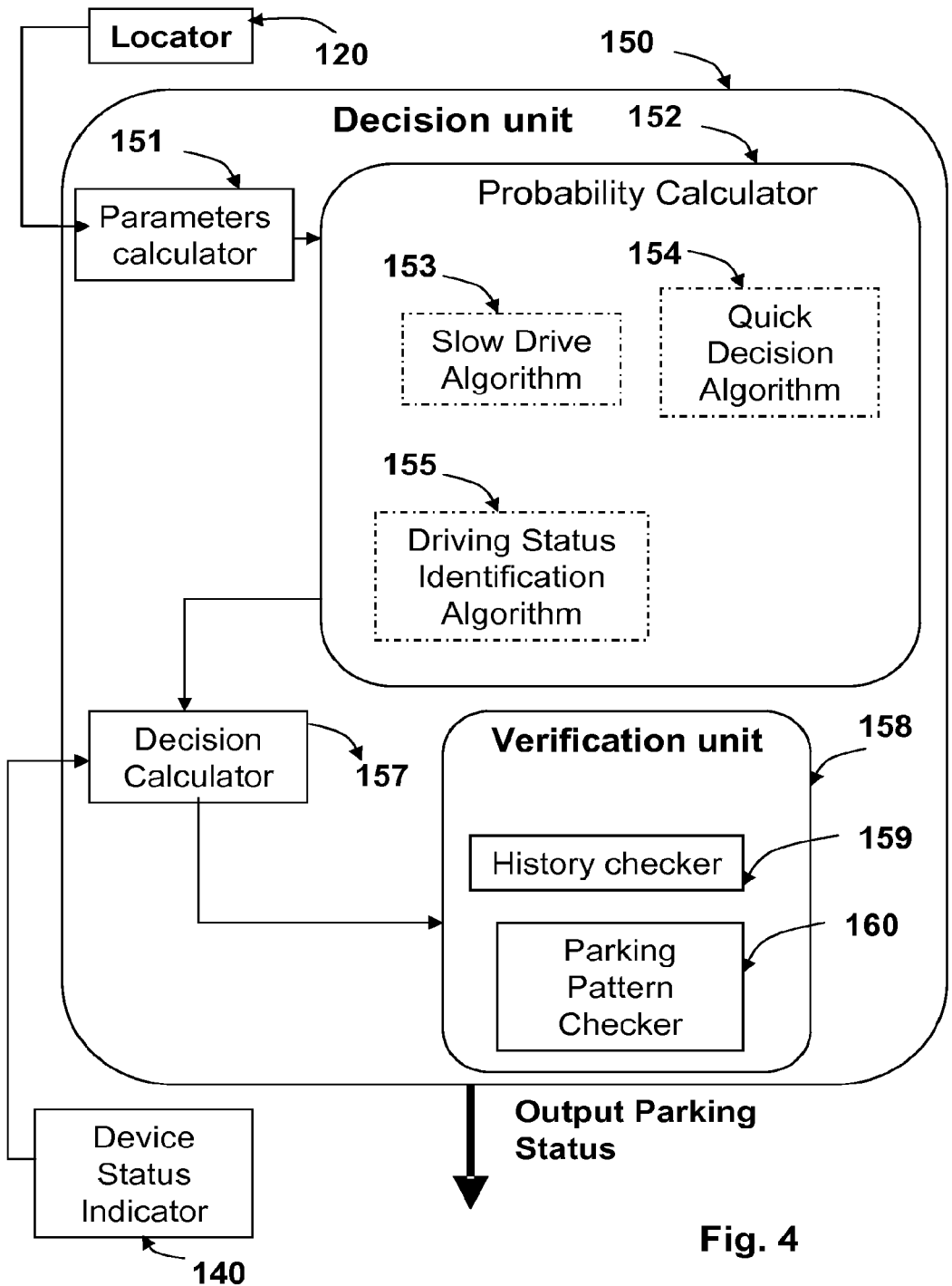
FIG. 4 is a schematic illustration of the decision unit of FIG. 3.

FIG. 4, to which reference is now made, shows an exemplary decision unit 150, constructed and operative in accordance with a preferred embodiment of the present invention. As disclosed hereinabove, decision unit 150 may be connected to locator 120 and/or device status indicator 140. Decision unit 150 may comprise: parameters calculator 151, probability calculator 154, decision calculator 157 and verification unit 158.

Parameters calculator 151 may retrieve data from locator and use it to calculate relevant parameters for device 100 such as, for example, velocity, acceleration, direction, direction diversion, and location precision. Probability calculator 152 that may use these parameters to calculate a Non-Driving Status Probability (NDSP) and a Driving Status Probability (DSP).

Decision calculator 157 may receive the calculated DSPs and NDSPs as well as the parameters calculated by calculator 151. Calculator 157 may then calculate a parking status for a vehicle that may be presumed to be associated with device 100. There may be at least three possible outcomes from decision calculator 157: Enter Parking (EnP), Exit Parking (ExP) or Parked. Decision calculator 157 may also receive additional indicators from device status indicator 140 that may facilitate in the decision-making that determines the parking status.

Verification unit 158 may verify the parking status outcome calculated by decision calculator 157. Unit 158 may comprise a history checker 159 and a parking pattern checker 160. History checker 159 may check learned statistics of false decisions to verify the outcome. Parking pattern checker 160 may check historical ExP and EnP parking patterns and the like to verify the outcome. Decision unit 150 may output parking status messages after they have been verified by unit 158. It will be appreciated that if verification unit 158 fails to verify a parking status decision, the decision may be ignored and no message output for transmission to server 200. Accordingly, unit 158 may be used to limit "false positive" messages.

In accordance with a preferred embodiment of the present invention, probability calculator 152 may comprise means to perform at least one or more of the following algorithms: a slow drive algorithm (SDA) 153, a quick decision algorithm (QDA) 154 and a driving-status identification algorithm (DSIA) 155. Each of these algorithms may output a DSP and a NDSP. For example, SDA 153 may output DSP1 and NDSP1; QDA 154 may output DSP2 and NDSP2; and DSIA 155 may output DSP3 and NDSP3. If multiple DSP/NDSP outputs may be calculated, probability calculator 152 may calculate and output a final DSP and NDSP based on a weighted scoring of the outputs.

Figure 5:
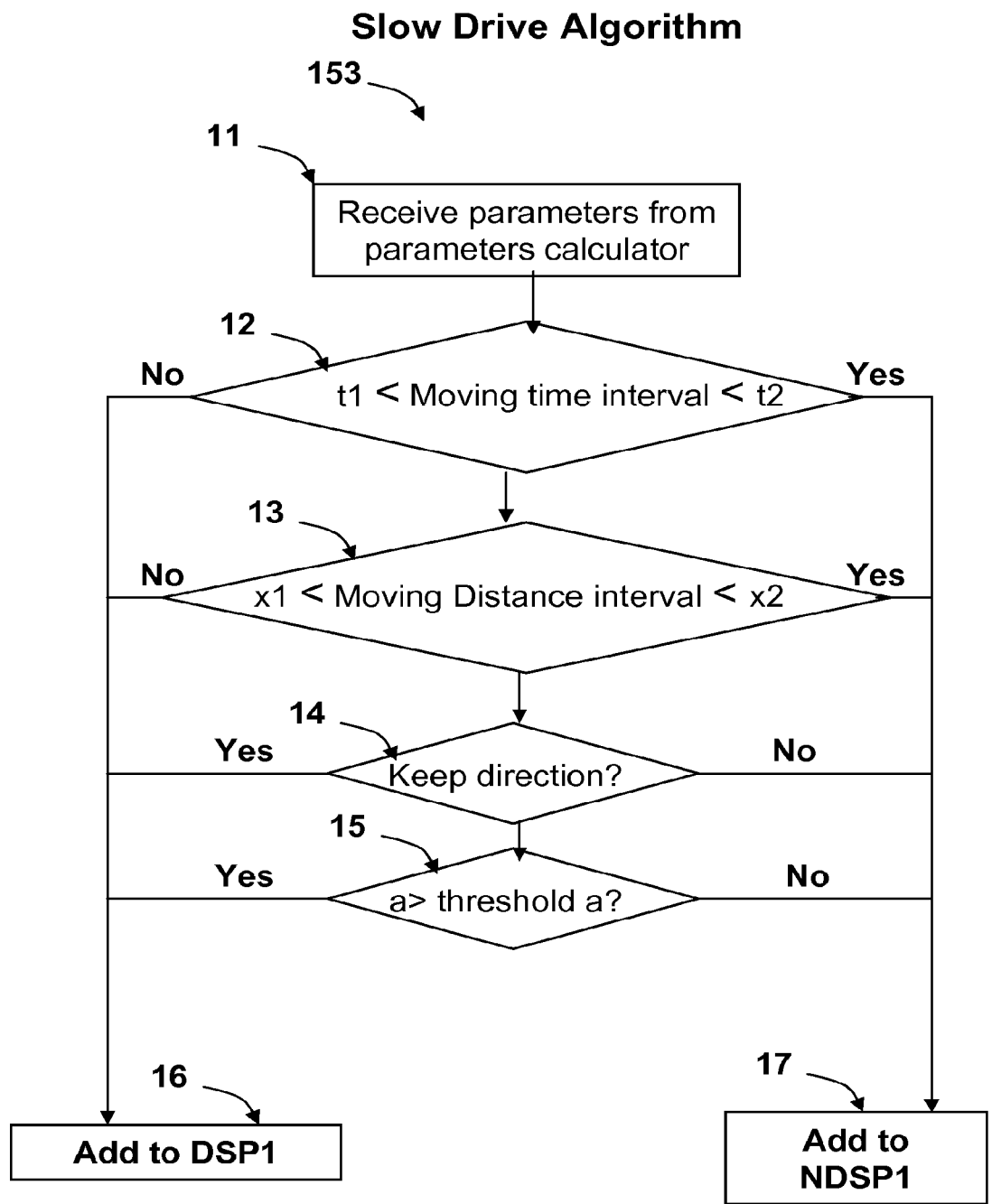
FIGS. 5-9 are flow charts that schematically illustrate processes performed by the decision unit of FIG. 4.

FIG. 5, to which reference is now made, illustrates the logical steps of slow-drive algorithm (SDA) 153. SDA 153 may be employed to calculate DSP/NDSPs when a calculated velocity of device 100 may be lower than a predefined threshold velocity "$V_{slow}$". Since device 100 may be a portable device, an ND status may occur when a user carries device 100 while walking, for example. In such a case, SDA 153 may facilitate in checking whether the calculated velocity is indicative of a driving velocity or a walking velocity.

Probability calculator 152 may receive (step 11) parameters from parameters calculator 151. The parameters may be, for example, the velocity of device 100 defined herein as "$V_{MCD}$" calculated from a location distance interval "$X_{MCD}$" and a moving time interval "$T_{MCD}$" based on parameters retrieved from locator 120. $T_{MCD}$ may be the time-interval between stops and $X_{MCD}$ may be the distance interval between stops.

Probability calculator 152 may check (step 12) whether the value for $T_{MCD}$ is in the time-range between low and high threshold time values t1 and t2 respectively. If the value of $T_{MCD}$ may not be within that time-range, a value of $P_{1a}$ may be added (step 17) to NDSP1. If the value of $T_{MCD}$ may be within that time-range, a value of $P_{1b}$ may be added (step 16) to DSP1. The values for $P_{1a}$ and $P_{1b}$ may be predefined, or alternatively defined as a function of the value of $T_{MCD}$.

Probability calculator 152 may similarly check (step 13) whether the value for $X_{MCD}$ is in the moving distance interval between low and high threshold distance values x1 and x2 respectively. If the value of $X_{MCD}$ may not be within that distance-range, a value of $P_{2a}$ may be added (step 17) to NDSP1. If the value of $X_{MCD}$ may be within that distance-range, a value of $P_{2b}$ may be added (step 16) to DSP1. As with the previous time interval check, the values for $P2_a$ and $P2_b$ may be predefined, or alternatively defined as a function of the value of $X_{MCD}$.

In accordance with a preferred alternative embodiment of the present invention, SDA 153 may also check the direction device 100. Using location information from locator 120, probability calculator 152 may check (step 14) whether device 100 has maintained the same general direction of movement. If yes, it may be indicative of continued driving and a value of $P3_b$ may be added (step 16) to DSP1. If not, it may not be indicative of continued driving and a value of $P3a$ may be added (step 17) to NDSP1.

Probability calculator 152 may similarly check (step 15) whether a value $D_{MCD}$, for the degree of directional shift of device 100 may exceed a threshold value d. If the value of $D_{MCD}$ may exceed d, it may be indicative of a vehicle turning and a value of $P_{4b}$ may be added (step 16) to DSP1. Otherwise, it may be indicative of someone walking, and a value of $P_{4a}$ may be added (step 17) to NDSP1. It will be appreciated that the values for $P3_a$ and $P3_b$ and $P4_a$ and $P4_b$ may be predefined, or alternatively defined as a function of the value of $X_{MCD}$.

Figure 6:
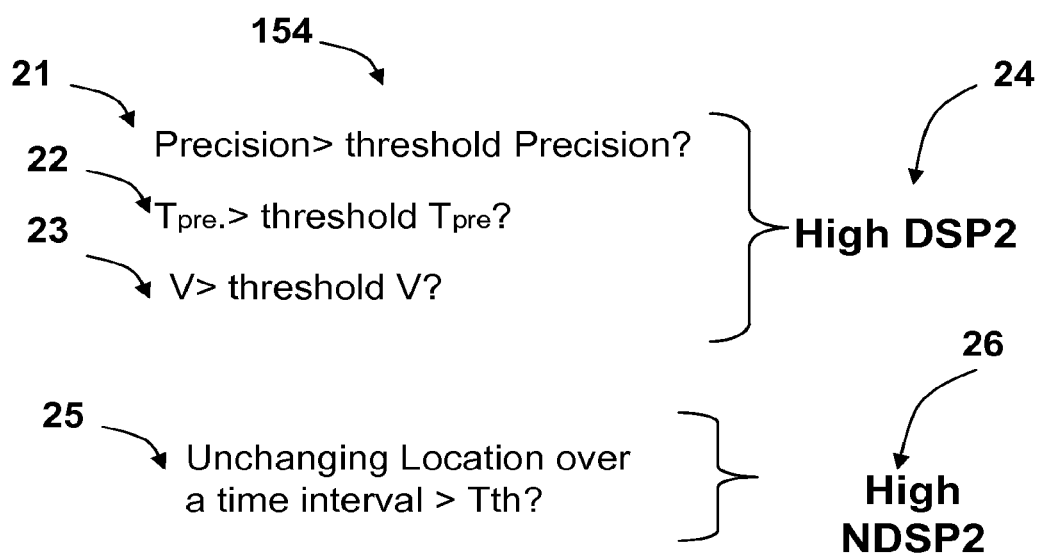

FIG. 6, to which reference is now made, illustrates the steps of quick decision algorithm (QDA) 154. QDA 154 may provide a quick probability assessment in specific situations. Probability calculator 153 may check (step 21) whether the precision of locator 120 exceeds a threshold precision; whether the precision continues to exceed (step 22) the threshold precision for at least a threshold period of time ($T_{pre}$); and whether velocity ($V_{MCD}$) may exceed (step 23) a predefined threshold velocity "$V_{th}$". If these checks may all result in positive results, there may be a higher probability that device 100 is in a moving vehicle. Accordingly, a predetermined value may be assigned (step 24) to DSP2. Alternatively, DSP2 may be calculated as a function of $V_{MCD}$.

Probability calculator 152 may also check (step 25) to verify whether the location of Device 100 may remain substantially unchanged for over a predetermined time-interval. If so, a predetermined value may be assigned (step 26) to NDSP2. Alternatively, DSP2 may be calculated as a function of the length of time that device 100 may be stationary.

Figure 7:
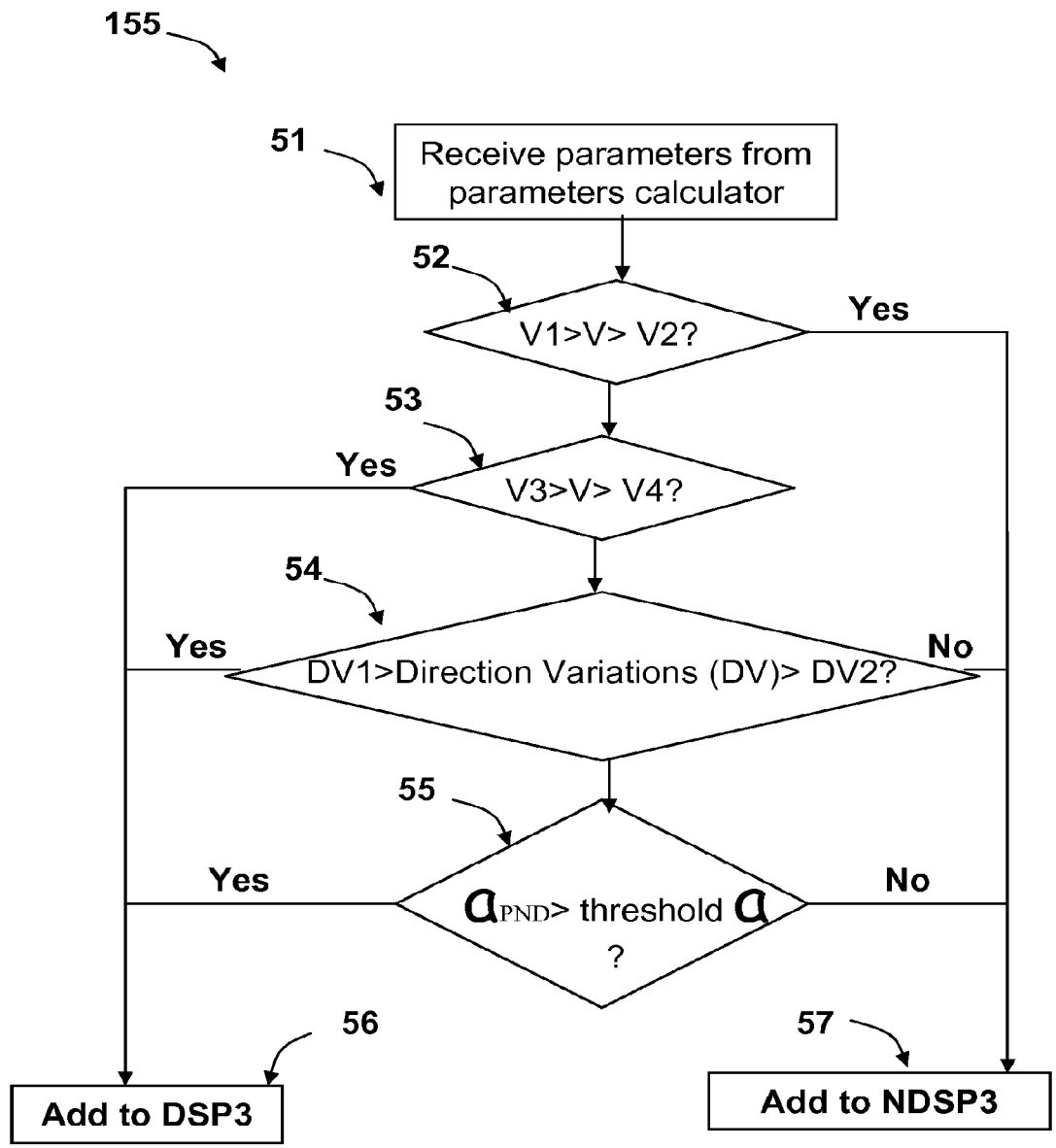

FIG. 7, to which reference is now made, illustrates an exemplary driving status identification algorithm (DSIA) 155. Probability calculator 152 may receive (step 51) parameters from parameters calculator 151. Calculator 152 may check (step 52) whether a velocity $V_{MCD\,for}$ device 100 is within a predefined low-velocity-range that is limited by V1 and V2 respectively 52. If so, a value may be assigned (step 57) to NDSP3. If not, then $V_{MCD}$ may be checked (step 53) whether it may be within a predefined high-velocity-range that is limited by V3 and V4. If so, an additional value may be added (step 56) to DSP3.

In accordance with an alternative preferred embodiment of the present invention, calculator 152 may also check (step 54) whether any direction diversions had been calculated and identified within a predetermined time-interval. If such diversions may have been identified, an additional value may be added (step 56) to DSP3 56. If no diversions may have been identified, an additional value may be added (step 57) to NDSP3 57.

In accordance with an alternative preferred embodiment of the present invention, calculator 152 may also check (step 55) whether an acceleration "$a_{MCD}$" for device 100 is greater than a predetermined acceleration-threshold. If "$a_{MCD}$" may exceed that acceleration-threshold, an additional value may be added (step 56) to DSP3 56. Otherwise, an additional value may be added to NDSP3 57. It will be appreciated that as in the previous embodiments, the values by which DSP3/NDSP3 may be incremented may be predefined or alternatively calculated as a function of the inputs of the specific check that may be performed.

Figure 8:
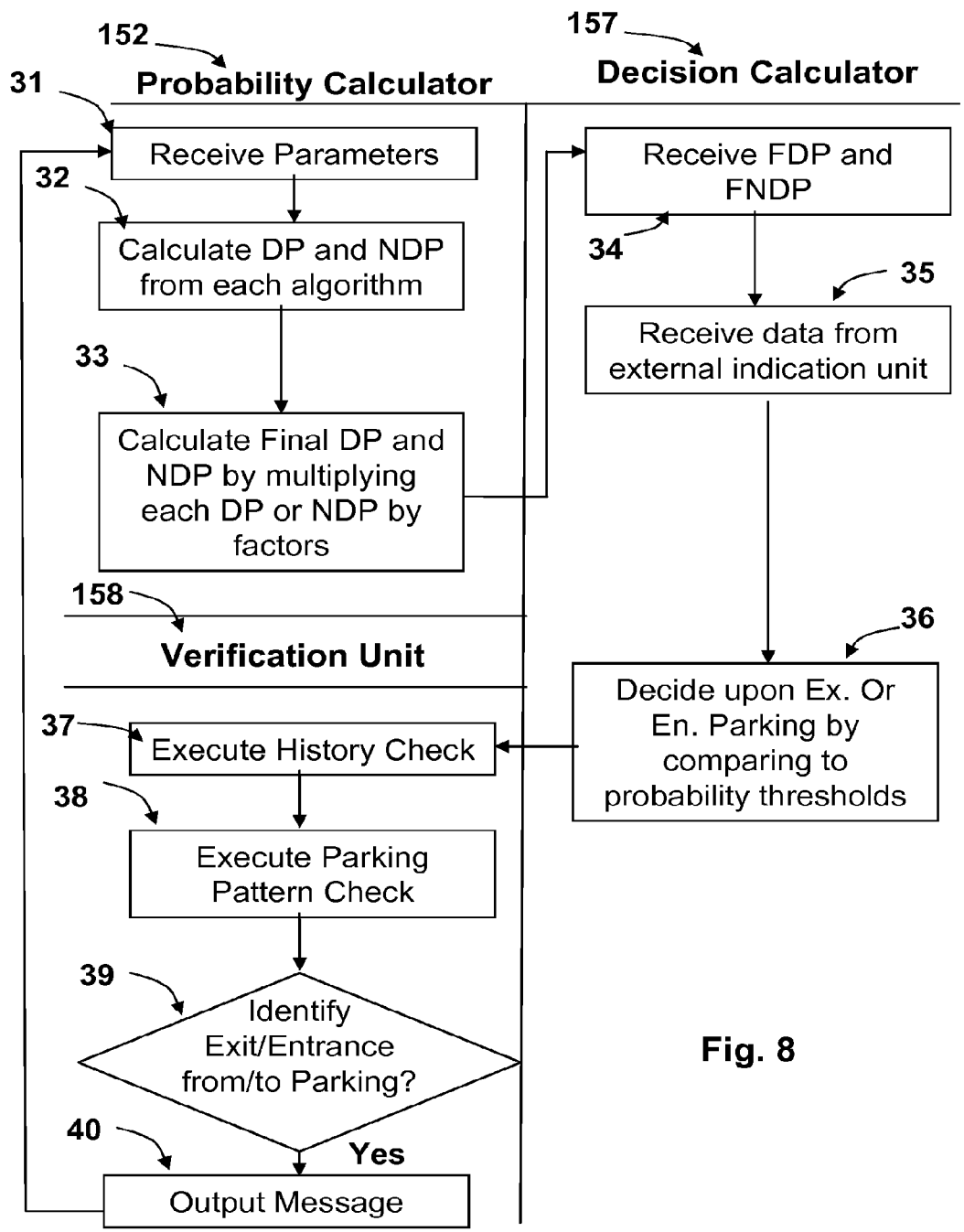

FIG. 8, to which reference is now made, illustrates an exemplary process flow that may be performed by decision unit 150 in accordance with a preferred embodiment of the present invention. Probability calculator 152 may receive (step 31) information from locator 120 that may be processed by parameters calculator to determine velocity, time, location, acceleration etc for device 100. Probability calculator 152 may use these parameters to calculate (step 32) values for driving probability (DP) and non-driving probability (NDP) as described hereinabove. Probability calculator may then execute a statistical module to calculate (step 33) a final DP (FDP) and a final NDP (FNDP) according to a predefined weighting of component factors $DSP_n$ and $NDSP_n$.

Decision calculator 157 may receive (step 34) FDP and FNDP as input values, as well receiving (step 35) data from device status indicator 140. Such data from indicator 140 may be, for example, any data that is transmitted from the user's device 100 or vehicle detectors. For example, data from device 100 may include: indications of turning off device 100, charging its battery, activating/de-activating a virtual keyboard, using a touch screen, increased data flow, and "hands free" speaker usage. Data from the vehicle may include: the detection of starting the vehicle's engine, detection of slamming of the vehicle's door etc.

Decision calculator 157 may use the FDP and FNDP values as well as external data to determine a parking status, such as an ExP, EnPSor or parked. If an ExP or an EnP may be identified, verification unit 158 may be invoked to verify the identified parking status. For example, history checker 159 may execute (step 37) a history check and/or parking pattern checker 160 may execute (step 38) a parking pattern check. If an ExPS or an EnPS is identified (step 39), unit 158 may output (step 40), a parking status message.

Figure 9:
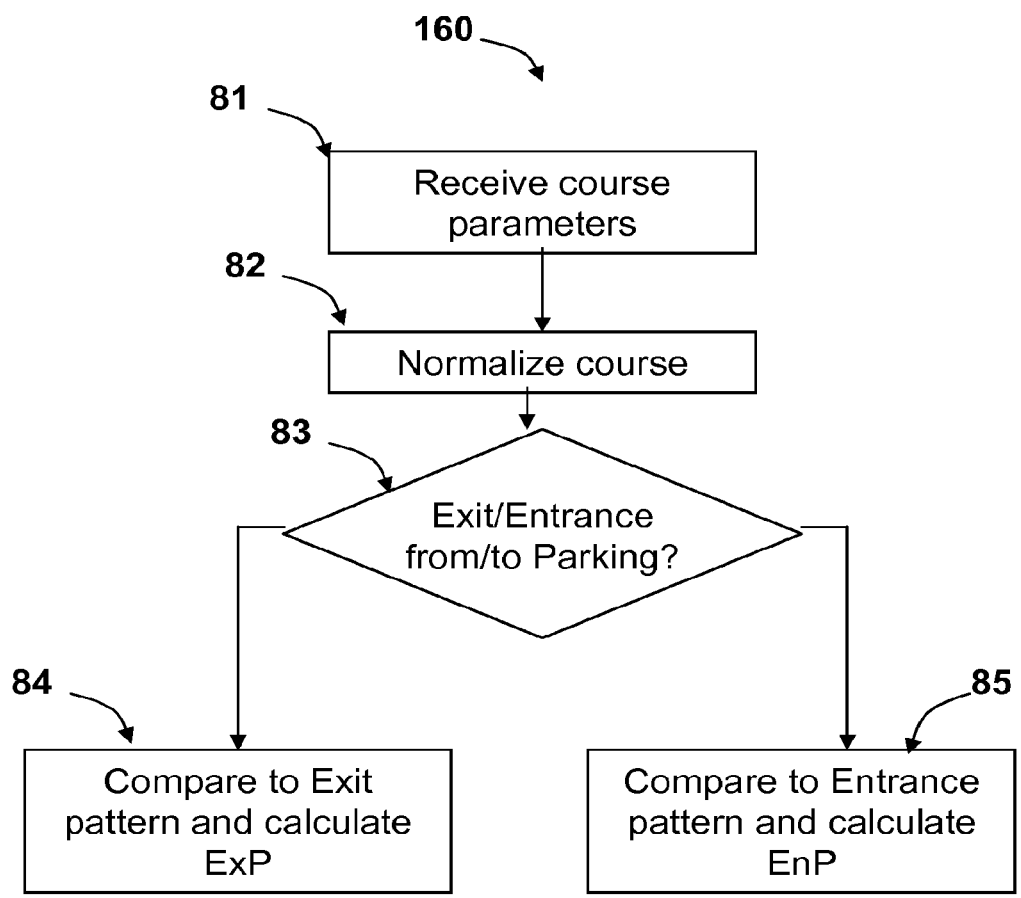

FIG. 9, to which reference is now made, illustrates an exemplary process flow for parking pattern checker 160. Parking pattern checker 160 may receive (step 81) or calculate details for a course of movement by device 100 within a predetermined time-interval. The course may be calculated, for example, using direction, velocity, time and location parameters. Checker 160 may normalize (step 82) according to preset directions and distances scales. If an ExP may have been identified (step 83) by decision calculator 157, checker 160 may compare (step 84) the calculated course of movement with an Exit-Parking pattern course. If an EnP may have been identified (step 83) by decision calculator 157, check 160 may compare (step 85) the course of movement with an Entering-Parking pattern.

It will be appreciated that in addition to identifying changes in parking statuses, the present invention may also gather and store extremely accurate information regarding the precise locations of users using devices 100 at the time of such changes. Modern location systems such as GPS may enable server 200 to use the parking status change messages to pinpoint the positioning of a device 100 within a few inches or feet. Applicants have realized that this positioning information received and processed by server 200 may be used to map available parking spaces and facilities in the areas frequented by members of community 250. By analyzing historical parking patterns, it may be possible to accurately map both on-street parking spaces and the location of parking facilities, such as parking lots and garages. It will be appreciated that this information may have value for third party applications not necessarily related to parking solutions. For example, a company selling theater tickets may license the information as an add on to their clients that may be looking for parking near the theater. Alternatively, a search engine may be configured to include parking information as part of its search results. For example, the engine may query the Internet regarding the availability of pizzerias in a given area. The search results may include a map indicating both pizzeras and available parking near their locations.

Figure 10:
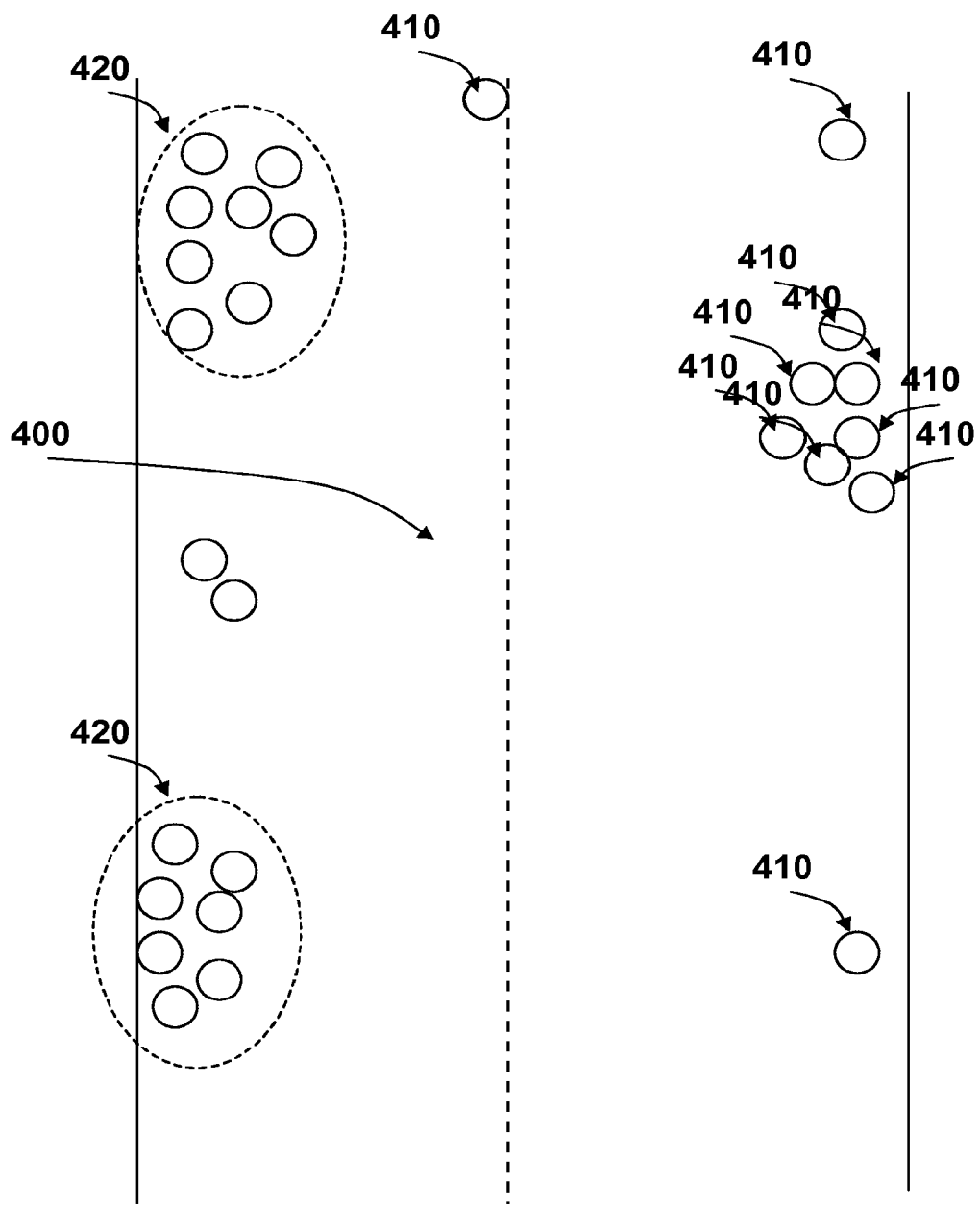
FIG. 10 is a schematic representation of an exemplary street.

FIG. 10, to which reference is now made, illustrates an exemplary street 400 in an area frequented by members of community 250. Circles 410 may indicate the locations in which decision unit 150 recently determined that a user's vehicle was parked. Clusters 420 may indicate spots on street 400 for which several parking determinations were made in close proximity to each other. In accordance with a preferred embodiment of the present invention, clusters 420 may be used to map available on street parking at a given time. Server 200 may comprise a surveyor application to periodically map actual parking instances and compare them from time to time. It will be appreciated that in such manner, an accurate representation of places available for parking in a given area may be maintained. Such a representation may include all of the parking spaces identified with a given time period, regardless of whether or not they may be currently occupied or vacant.

It will also be appreciated, that the same method may be used to determine the location and configuration of parking facilities. Parking patterns in such places may be denser, showing vehicles parked side by side in multiple rows, in areas not marked as roadways.

It will further be appreciated, that by analyzing the movements of vehicles as they enter and leave identified parking facilities, it may be possible for server 200 to identify the entrances and exits with reasonable accuracy. In accordance with an alternative preferred embodiment of the present invention, the parking status messages sent by devices 100 may also comprise a log of recent locations that may generally indicate the movements and/or speed of device 100 in a predefined period of time immediately prior to parking. Alternatively, devices 100 may transmit location information on a regular basis without regard to whether or not a change in parking status may have occurred. In either case, server 200 may cross reference this information to identify the locations through which vehicles pass in order to enter/exit parking facilities.

This information may then be downloaded to devices 100 and used to determine EnP and ExP statuses. For example, when a device 100 may enter a known parking garage entrance, it may indicate that a vehicle is parking. Similarly, when a vehicle passes through a known exit, it may indicate that it is exiting parking. It will therefore be appreciated that by mapping points of access, it may be possible to even predict changes in parking status before they even occur. As devices 100 may pass through known entrance/exits, it may be assumed that their most recently determined parking status will change in the near future. For example, when a vehicle may enter a parking lot, it may be expected that it will park. Similarly, when a vehicle passes through an exit point it may be assumed that it is exiting parking even if probability calculator 152 did not previously detect this state when the vehicle began moving (which may, for example, occur when there is less than optimal GPS reception in a multi-level parking facility). In such cases, decision unit 150 may return statuses of "expected entering parking" (xEnP) and "expected exiting parking" (xExP). Server 200 may then include these expected statuses in the next parking status notification it sends for the area in question.

Expected changes may also be determined based on the movement of device 100 while its associated vehicle may be parked. For example, a vehicle may be determined to be parked in a parking space in a specific location. Its owner, carrying device 100, may then walk to a nearby store. A half any hour later device 100 may then begin to "retrace its steps" back to where its associated vehicle was parked. Decision unit 150 may comprise a predictor utility to analyze the movements of device 100 and predict that it is returning to a parked vehicle. Decision unit 150 may use the output of the predictor to send an xExP status message even before the user reaches the parked vehicle.

The predictor utility may also be similarly used to predict an xEnP. For example, a user's vehicle may have been determined to be parked in a parking space in a specific location. The user's device 100 may then begin moving in a manner indicative of driving. If at some point within a predefined time frame device 100 may begin retracing its steps to the previous parking location, the predictor utility may surmise that the user may intend to park a vehicle in the same general area as that location. Decision unit 150 may accordingly use the output of the predictor to send an xEnP status message even before the user reaches the parking location.

It will be appreciated that once a parking space has been exited, the likelihood increases that someone not equipped with a device 100 has parked there. Accordingly, notifications to users may indicate the timeliness of the status. For example, a recently vacated spot may be shown a blue dot on a map. Every five minutes the color may change progressively from blue to green, to yellow, to red. After a preset amount of time, the indication may be deleted altogether.

It will be appreciated that device 100 may be configurable to allow a user to set preferences. For example, the user may set preferences for automatic notification on/off, relevant reporting radius, language, server update rate, network traffic limit, auto start option, auto zoom for nearest parking space, auto zoom as a function of vehicle speed, and sound on/off.

It will also be appreciated that the methods disclosed hereinabove may be adapted to provide location services to users that have forgotten where they parked. A user may use device 100 to initiate a "where is my car?" query to reference historical data that may be saved either on device 100 or server 200. The response may be an indication of the user's location the last time a "parked" status may have been determined.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    in response to a search query, searching, by a computing device, a repository to identify a list of results matching the search query, wherein each result is associated with an address;
    determining, by the computing device, parking availability in an area in the vicinity of each of said addresses; and
    presenting to a user the list of results, wherein said presenting provides for each result at least an indication of the current parking availability associated with the result.

2. The method of claim 1, wherein said determining is based on an available parking database that is derived from a community of members based on tracking movements of the members and without having prior knowledge of existence of parking spaces at given locations.

3. The method of claim 2, wherein the tracking movements of the members is performed using Global Positioning System (GPS) modules of mobile devices of the members.

4. The method of claim 2, wherein the tracking movements of the members is performed using data derived from accelerometers of mobile devices of the members.

5. The method of claim 1, wherein said searching is performed by a search engine configured to search for web pages relating to the search query, wherein each result of the list of results is a web page.

6. The method of claim 1, wherein the repository comprises a set of services, wherein the address associated with a service is a business address where the service is available.

7. A method comprising:
    receiving parking status messages from members of a parking community, wherein said messages are generated automatically by mobile devices of the members of the parking community without user input and without having a priori knowledge of locations of usable parking spaces;
    analyzing the parking status messages to derive an available parking database relating to a variety of locations; and
    providing parking availability information to a user, wherein the parking availability information relates to a location selected from the variety of locations.

8. The method of claim 7, wherein the messages are generated based on data derived from Global Positioning System (GPS) modules of mobile devices of the members of the parking community.

9. The method of claim 7, wherein the messages are generated based on data derived from accelerometers of mobile devices of the members of the parking community.

10. A method comprising:
    receiving parking status messages from members of a parking community, said messages indicating at least a current location and a parking status, wherein said messages are generated automatically by mobile devices of the members of the parking community and without user input;
    mapping, by the computing device, said parking statuses per said locations to derive a persistent representation of usable parking spaces; and
    whereby the computing device generating a persistent representation of usable parking spaces in a variety of locations without having prior knowledge of the existence of said usable parking spaces at the variety of locations.

11. The method according to claim 10 further comprising:
    identifying clusters of said usable parking spaces indicative of a parking facility location, wherein said identifying is performed without having prior knowledge of the existence of the parking facility location; and
    analyzing parking patterns from said parking status messages to determine one or more locations for an entrance to or an exit from said parking facility location, wherein the determined one or more locations are different than locations of the said usable parking spaces, wherein said parking status messages indicate at least a recent history of locations.

12. The method of claim 11, wherein the messages are generated based on data derived from Global Positioning System (GPS) modules of mobile devices of the members of the parking community.

13. The method of claim 11, wherein the messages are generated based on data derived from accelerometers of mobile devices of the members of the parking community.

14. The method of claim 10, wherein the messages are generated based on data derived from Global Positioning System (GPS) modules of mobile devices of the members of the parking community.

15. The method of claim 10, wherein the messages are generated based on data derived from accelerometers of mobile devices of the members of the parking community.

16. An apparatus comprising a processor, wherein said processor is configured to perform the steps of:
    receiving parking status messages from members of a parking community, wherein said messages are generated automatically by mobile devices of the members of the parking community without user input and without having a priori knowledge of locations of usable parking spaces;

analyzing the parking status messages to derive an available parking database relating to a variety of locations; and providing parking availability information to a user, wherein the parking availability information relates to a location selected from the variety of locations.

17. The apparatus of claim 16, wherein the messages are generated based on data derived from Global Positioning System (GPS) modules of mobile devices of the members of the parking community.

18. The apparatus of claim 16, wherein the messages are generated based on data derived from accelerometers of mobile devices of the members of the parking community.

19. An apparatus comprising a processor, wherein said processor is configured to perform the steps of:
receiving parking status messages from members of a parking community, said messages indicating at least a current location and a parking status, wherein said messages are generated automatically by mobile devices of the members of the parking community and without user input;
mapping, by the computing device, said parking statuses per said locations to derive a persistent representation of usable parking spaces; and
whereby the computing device generating a persistent representation of usable parking spaces in a variety of locations without having prior knowledge of the existence of said usable parking spaces at the variety of locations.

20. The apparatus according to claim 19, wherein the processor is further configured to perform:
identifying clusters of said usable parking spaces indicative of a parking facility location, wherein said identifying is performed without having prior knowledge of the existence of the parking facility location; and
analyzing parking patterns from said parking status messages to determine one or more locations for an entrance to or an exit from said parking facility location, wherein the determined one or more locations are different than locations of the said usable parking spaces, wherein said parking status messages indicate at least a recent history of locations.

21. The apparatus according to claim 19, wherein the messages are generated based on data derived from Global Positioning System (GPS) modules of mobile devices of the members of the parking community.

22. The apparatus according to claim 19, wherein the messages are generated based on data derived from accelerometers of mobile devices of the members of the parking community.

23. An apparatus comprising a processor, wherein said processor is configured to perform the steps of:
in response to a search query, searching a repository to identify a list of results matching the search query, wherein each result is associated with an address;
determining parking availability in an area in the vicinity of each of said addresses; and
presenting to a user the list of results, wherein said presenting provides for each result at least an indication of the current parking availability associated with the result.

24. The apparatus of claim 23, wherein said determining is based on an available parking database that is derived from a community of members based on tracking movements of the members and without having prior knowledge of existence of parking spaces at given locations.

25. The apparatus of claim 23, wherein said searching is performed by a search engine configured to search for web pages relating to the search query, wherein each result of the list of results is a web page.

* * * * *